Nov. 1, 1932.     R. MINKOW     1,885,370

COMBINED ADJUSTING AND GAUGE HEADS FOR CORNER CUTTING MACHINES

Filed Aug. 13, 1931

INVENTOR

Robert Minkow

Patented Nov. 1, 1932

1,885,370

UNITED STATES PATENT OFFICE

ROBERT MINKOW, OF NEW YORK, N. Y.

COMBINED ADJUSTING AND GAUGE HEADS FOR CORNER CUTTING MACHINES

Application filed August 13, 1931. Serial No. 556,776.

This invention relates to improvements in attachments for machines for cutting corners from flat cardboard and similar stock, employed in the manufacture of cardboard boxes, and its leading object is to provide a pair of gauges which can be accurately adjusted, which will retain their adjustment against the repeated thrusts imposed upon them by the machine feeder, in pushing cardboard against the gauges, and which will not break the table.

Another object of the invention is the provision of a pair of gauges for a corner cutting machine, which can be quickly and easily adjusted by a man operator, without using tools of any kind, and yet, when adjusted, will effectively withstand all thrusts imposed upon them by the constantly feeding of heavy cardboard against the gauges.

With the above and other objects in view the invention consists in certain new and useful constructions, combinations, and arrangements of parts, clearly described in the following specification, and fully illustrated in the accompanying drawing, in which:—

Figure 1:
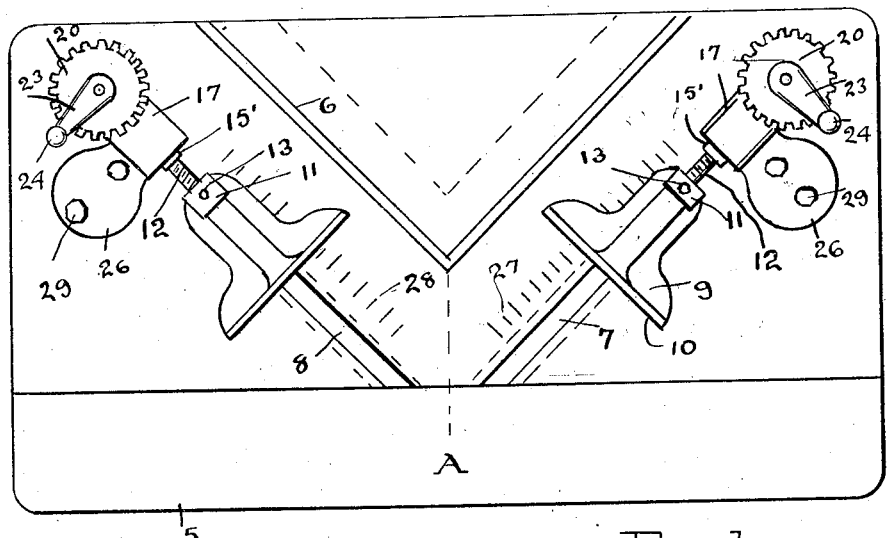
Fig. 1 is a plan view of the table of a corner cutting machine equipped with the improved gauges, the working parts of the machine being omitted.
Figures 2, 3:
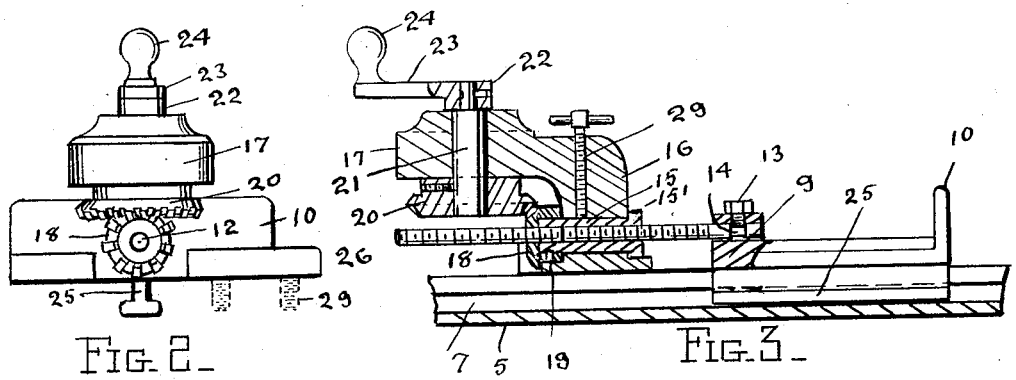
Fig. 2 is a view in end elevation of one of the gauges.
Fig. 3 is a longitudinal vertical sectional view, taken through the adjusting head, the movable gauge being shown in elevation.

Referring to the accompanying drawing illustrating the practical embodiment of my invention, 5 designates the table of a corner cutting machine, which is equipped with the right-angular stationary knife 6, across which the power driven machine knife works, which is not shown for convenience.

This table is provided with the angularly disposed T-slots 7 and 8, which are disposed in parallel relation to the legs of the stationary knife 6.

A stock gauge member or head 9 is mounted to slide horizontally over the slot 7. The gauge head is equipped with a stock engageable straight abutment flange 10 on one end, and with a bearing 11 on the other end, in which the forward end of the screw shaft 12 is secured, as by the screw 13, which is arranged to engage the groove 14 of said screw shaft.

The screw shaft 12 extends through the sleeve nut 15, one end of which is equipped with a shoulder 15' to engage the upright 16 of the adjusting head. A horizontal arm 17 is formed integral with the upright 16. On the sleeve nut 15 the small bevel pinion gear 18 is secured by means of the set screw or pin 19. This bevel gear is engaged by the bevel gear driver 20, which is formed on or secured to the vertical shaft 21, which is journaled in the arm 17. The upper end of the arm 17 is formed with a flat face and the upper end of the shaft 21 is reduced and the hub 22 of the handle 23 is fixed thereon, so that it will rotate close to or in frictional contact with the flate upper face of the arm 17.

The screw shaft 12 is arranged to project under the horizontal bevel gear driver 20, so that its position in no way interferes with the operation of the adjusting head. The handle 23 is provided with an upstanding knob 24, so that it may be readily turned.

The gauge head is preferably provided with depending lugs 25, which are designed to slide in the T-slot 7, and to thereby hold the gauge head against lateral yielding.

The adjusting head is equipped with a lateral base support 26, which may be positively bolted or connected to the machine table 5.

The T-slot 8 is engaged by a similar combined adjusting head and gauge head, the individual parts of which bear reference ordinals corresponding to those applied to the device which works over the T-slot 7.

In order to assist in the accurate adjustment of the gauge heads, the table 5 is formed with precision markings or graduations 27, disposed along the line of the slot 7, and similar markings or graduations 28, disposed along the slot 8.

When it is desired to cut the corners from stock, a pattern sheet is placed upon the table and the adjusting heads are operated by turning the handles thereof, so that the gauge heads are shifted to the desired positions on the table. When the adjustment of the gauge heads has been completed, the relation of the straight abutment flanges thereof to the scale markings on the table can be checked to determine the distance of the gauge heads from the median line A, which marks the junction of the two sides of the stationary knife 6. The adjustment is held against change by means of the set screw 29, which engages the sleeve nut 15, which carries the pinion gear 18.

The gauge heads are so constructed and operated that no crushing pressure is applied on the sides of the T-slots, and due to the fact that the screws are accurately threaded in their nuts, and the latter are held in their frames against yielding, no significant play of the gauge heads on the machine table can occur. By releasing the holding set screw 29 of each adjusting head the man who usually operates the corner cutter machine can quickly, easily, and accurately adjust the gauge head, and when it has been adjusted it will retain its position against displacement under the thrusts of the heavy sheets of cardboard stocks which are pushed rapidly against the same.

My improved precision adjustable gauges and corner machine table dispenses with the use of the present type of gauges, which involve the use of a clamping screw for holding the gauge plate against shifting, under the thrusts produced by the work against the same. The use of the present type of gauges results in irregular cutting, due to the fact that no matter how tightly the holding screw is clamped in place, there will be a shifting of the gauge plate. Many bed plates or machine tables are broken because the holding screws, of the present gauge devices crush the walls of the T-shaped slots. With this type of gauge plates and holding means it is very difficult to obtain exact adjustment, as the holding screw has a tendency to shift the gauge plate when it is being tightened in place.

With my improved combined adjusting head and gauge plate or device, a micrometric adjustment can be made by an unskilled machine operator, usually a boy or man, and this adjustment will be maintained against yielding, no matter how strong the thrusts of the work upon it. The holding action does not involve subjecting the walls of the T-slots to a compression action, under the force of a clamping screw, and these slots merely serve to hold the gauge heads in correct angular alignment to the machine table. If the gauges are to be set in different relation to the median line A it is possible to control the exact differences of adjustment, due to the scale marking on the machine table. The adjusting heads are clamped or otherwise secured to the machine table, so that no compression strains are imposed upon the sides of the T-slots, and the location of such connection need not be changed.

My improved combined equipment will materially reduce errors in cutting, and therefore losses in the cost of the stock and of labor for handling the same, which result from present inaccurate cutting, consequent from the repeated slipping of the present gauge heads. This saving will have the clear effect of increasing production. The adjustment of the gauge heads will not have to be checked from time to time, as displacement is impossible.

My invention not only eliminates the present causes for breakage of the T-slots of the machine table, but also the present causes for the breakage of the adjusting handles or clamps, due to the effort to subject them to effective holding or clamping pressure.

Various changes may be resorted to, to adapt the combined equipment to corner cutting machines of different size and design, without departing from the scope of the invention, as defined in the claims annexed hereto.

Having described my invention I claim:—

1. The combination with the cutting table of a corner cutting machine designed to operate on cardboard and constructed with angularly disposed guiding slots, of a gauge head mounted on the table to work over each slot and provided with means engaging the slot to prevent lateral displacement therefrom, and an adjusting head for each gauge head secured in place on the machine table distantly of the adjacent guiding slot, each adjusting head including a stationary upright having an integral horizontal arm, an internally threaded sleeve mounted for rotation in the upright and held against endwise movement therein, a bevel pinion gear mounted on said sleeve, a shaft journaled in the horizontal arm and equipped with a bevel driving gear meshing with the bevel pinion gear, a handle on said shaft for turning the gears and the screw shaft, and a swivel connection between the shaft and the gauge head.

2. The combination with the cutting table of a machine for cutting corners from flat cardboard stock for making boxes, said table having a stationary right angular cutting knife thereon and T-slots disposed in parallel relation to the sides of the cutting knife and spaced therefrom, a gauge head slidable over each slot and having a depending flange fitting in the slot, a screw shaft swiveled to the gauge head, an adjusting head having an upright and an integral horizontal arm, a screw sleeve mounted to turn in the upright and constructed to engage and propel the screw shaft, a bevel pinion gear on the screw shaft, a shaft journaled on the horizontal arm, a bevel driving gear larger than the pinion gear carried by the shaft and arranged to work under the arm and meshing with the pinion gear, the screw shaft being mounted so that it can project under the bevel driving gear, the table being provided with scale markings located along each slot thereof to assist in the precision adjustment of the gauge head.

In testimony whereof I affix my signature.

ROBERT MINKOW.